United States Patent
Kumar et al.

(10) Patent No.: US 12,511,165 B2
(45) Date of Patent: Dec. 30, 2025

(54) WORKSPACE TRANSITION SYSTEM AND METHOD FOR MULTI-COMPUTING DEVICE ENVIRONMENT

(71) Applicant: Dell Products, L.P., Round Rock, TX (US)

(72) Inventors: Ankit Kumar, Deoghar (IN); Srinivasa Ragavan, Bangalore (IN); Michael S. Gatson, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 715 days.

(21) Appl. No.: 17/811,803

(22) Filed: Jul. 11, 2022

(65) Prior Publication Data
US 2024/0012689 A1  Jan. 11, 2024

(51) Int. Cl.
*G06F 9/50* (2006.01)

(52) U.S. Cl.
CPC ............ *G06F 9/505* (2013.01); *G06F 9/5072* (2013.01)

(58) Field of Classification Search
None
See application file for complete search history.

(56) References Cited

U.S. PATENT DOCUMENTS

| | | | |
|---|---|---|---|
| 2012/0023223 A1* | 1/2012 | Branch | G06F 9/4856 709/224 |
| 2019/0108059 A1* | 4/2019 | Marmignon | G06F 9/485 |

* cited by examiner

*Primary Examiner* — Eric C Wai
(74) *Attorney, Agent, or Firm* — Fogarty LLP

(57) ABSTRACT

A system and method for transitioning workspaces in a multi-device environment are described. In an illustrative, non-limiting embodiment, an IHS may include computer-executable instructions to receive a request to transition a workspace from the IHS to a computing platform external to the IHS. Based upon the request, the instructions calculate a first Best Known Configuration (BKC) for executing the workspace on the IHS, and transmit the obtained BKC to the computing platform. The computing platform uses the BKC to calculate a second BKC for executing the workspace on the computing platform based on the capabilities of the computing platform, and instantiate the workspace on the computing platform using the second BKC. The BKC is based on workspace parametric data associated with operation of the workspace on the IHS.

20 Claims, 6 Drawing Sheets

| BKC SAMPLE NO | IHS DEVICE | BKC CALCULATION PARAMETER | ATTRIBUTE | VALUE |
|---|---|---|---|---|
| BCK1 (400A) | DELL LATITUDE LAPTOP (404A) | PERIPHERALS CONNECTED | HEADSET VOLUME | 30% |
| | | | MICROPHONE VOLUME | 60% |
| | | | WEB CAM QUALITY | 6PM |
| | | | USB THUMB DRIVE | 24GB |
| | | DEVICE CONFIGURATION | CPU CORES | 8 |
| | | | CPU CLOCK SPEED | 1.90 GHZ |
| | | | TOTAL MEMORY | 16GB |
| | | | MEMORY BEING CONSUMED BY APPS IN WS | 10GB |
| | | | GPU AVAILABILITY | YES |
| | | USER USAGE PATTERN | USER USAGE CLASSIFICATION (HEAVY / MEDIUM / LOW) | HEAVY |
| | | N/W CONNECTIVITY STATUS | INTERNET BANDWIDTH | 100 MBPS |
| | | | LATENCY | 50 MS |
| BCK2 (400B) | MOBILE IHS DEVICE (404B) | PERIPHERALS CONNECTED | HEADSET VOLUME | 30% |
| | | | MICROPHONE VOLUME | 60% |
| | | | WEB CAM QUALITY | 24MP |
| | | | USB THUMB DRIVE | NA |
| | | DEVICE CONFIGURATION | CPU CORES | 2 |
| | | | CPU CLOCK SPEED | 1.40 GHZ |
| | | | TOTAL MEMORY | 4 GB |
| | | | MEMORY BEING CONSUMED BY APPS IN WS | 2 GB |
| | | | GPU AVAILABILITY | NO |
| | | USER USAGE PATTERN | USER USAGE CLASSIFICATION (HEAVY / MEDIUM / LOW) | MEDIUM |
| | | N/W CONNECTIVITY STATUS | INTERNET BANDWIDTH | 10 MBPS |
| | | | LATENCY | 100 MS |

FIG. 4

WORKSPACE TRANSITION SYSTEM AND METHOD FOR MULTI-COMPUTING DEVICE ENVIRONMENT

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs can execute many diverse types of applications. In some IHSs, a machine learning (ML) engine (e.g., optimization engine) may be used to improve application performance by dynamically adjusting IHS settings. Particularly, a ML engine may apply a profile to adjust the operation of certain resources of the IHS, such as the operating system (OS), hardware resources (e.g., central processing units (CPUs), graphics processing units (GPUs), storage, etc.), or drivers used to interface with those hardware resources, or other applications that may be executed by the IHS.

IHSs provide users with capabilities for accessing, creating, and manipulating data. IHSs often implement a variety of security protocols in order to protect this data during such operations. A known technique for securing access to protected data that is accessed via an IHS is to segregate the protected data within an isolated software environment that operates on the IHS, where such isolated software environments may be referred to by various names, such as virtual machines, containers, dockers, etc. Diverse types of such segregated environments are isolated by providing varying degrees of abstraction from the underlying hardware and operating system of the IHS. These virtualized environments typically allow a user to access only data and applications that have been approved for use within that particular isolated environment. In enforcing the isolation of a virtualized environment, applications that operate within such isolated environments may have limited access to capabilities that are supported by the hardware and operating system of the IHS. In addition, each such isolated environment may operate without regard to other instances of such environments that are operating on the same IHS, including without regard to resources that are in use by the other environment operating in isolation on that same IHS.

SUMMARY

A system and method for transitioning workspaces in a multi-device environment are described. In an illustrative, non-limiting embodiment, an IHS may include computer-executable instructions to receive a request to transition a workspace from the IHS to a computing platform external to the IHS. Based upon the request, the instructions calculate a first Best Known Configuration (BKC) for executing the workspace on the IHS, and transmit the obtained BKC to the computing platform. The computing platform uses the BKC to calculate a second BKC for executing the workspace on the computing platform based on the capabilities of the computing platform, and instantiate the workspace on the computing platform using the second BKC. The BKC is based on workspace parametric data associated with operation of the workspace on the IHS.

According to another embodiment, a workspace transitioning method includes the steps of receiving a request to transition a workspace from an Information Handling System (IHS) to a computing platform external to the IHS, and calculating a first Best Known Configuration (BKC) for executing the workspace on the IHS. The BKC is based on workspace parametric data associated with operation of the workspace on the IHS. The method also includes the step of transmitting the obtained BKC to the computing platform in which the computing platform uses the BKC to calculate a second BKC for executing the workspace on the computing platform based on the capabilities of the computing platform, and instantiating the workspace on the computing platform using the second BKC.

According to yet another embodiment, a memory storage device has program instructions stored thereon that, upon execution by one or more processors of an Information Handling System (IHS), cause the IHS to receive a request to transition a workspace from the IHS to a computing platform external to the IHS, and calculate a first Best Known Configuration (BKC) for executing the workspace on the IHS. The BKC is based on workspace parametric data associated with operation of the workspace on the IHS. The instructions also cause the IHS to transmit the obtained BKC to the computing platform in which the computing platform uses the BKC to calculate a second BKC for executing the workspace on the computing platform based on the capabilities of the computing platform, and instantiate the workspace on the computing platform using the second BKC.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 illustrates how two example best known configurations (BKCs) may be calculated using two different IHSs according to one embodiment of the present disclosure.

DETAILED DESCRIPTION

Figure 1:
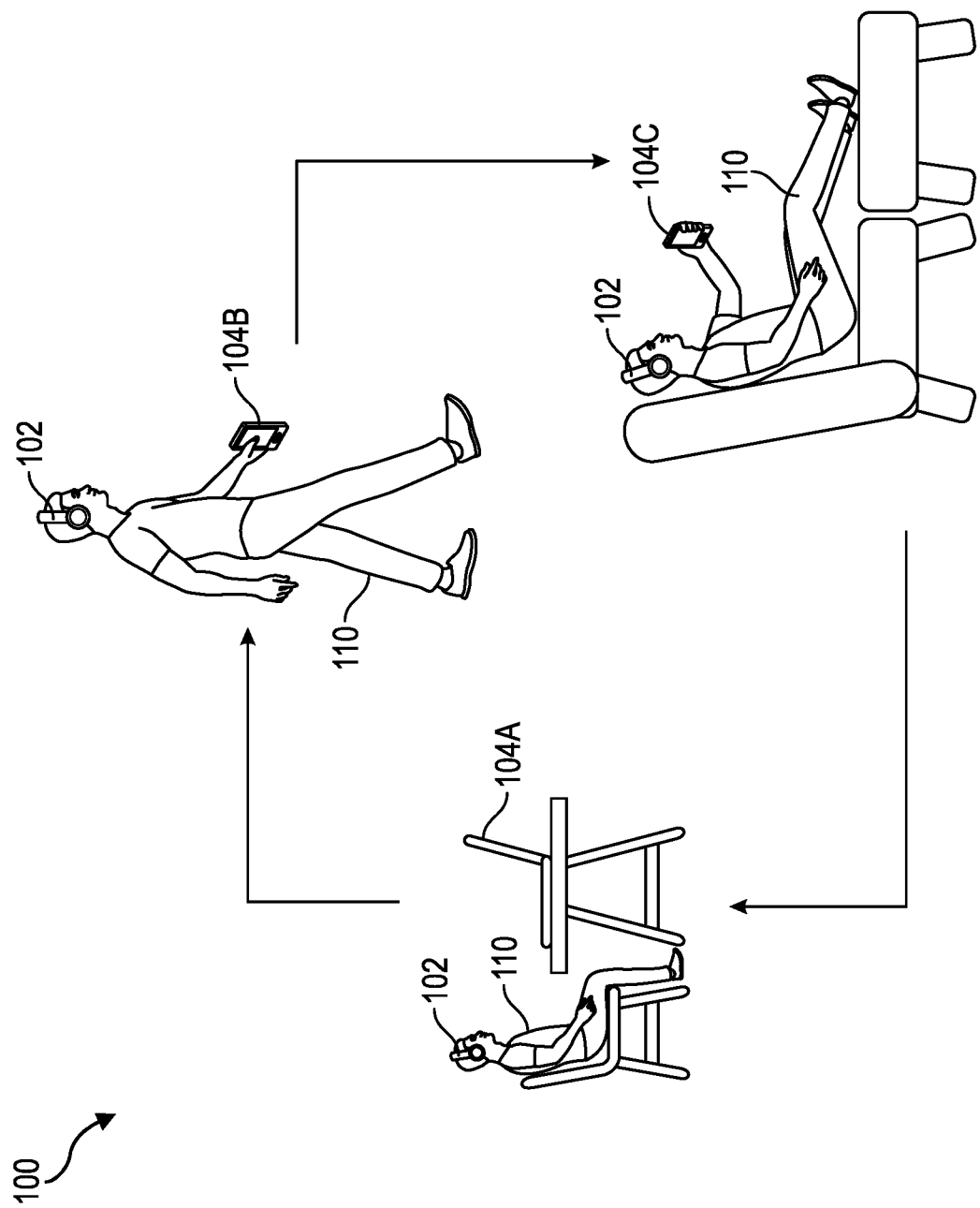
FIG. 1 illustrates an example workspace transitioning system that may be used to dynamically calculate a best known configuration for the workspace on the target computing platform based upon the performance capabilities of the target computing platform according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Embodiments of the present disclosure provide a seamless workspace transition system and method that migrates workspaces from one computing platform (e.g., Information Handling System) to another in a manner that optimizes performance of the workspaces according to its best known configuration. Whereas conventional systems do not address seamless transitions of workspaces according to their context, performance of the transitioned workspaces on the target computing platforms often suffer due, in large part, to lack of workspace optimization that was previously obtained on their previously used computing platforms. Embodiments of the present disclosure provide a solution to this problem, among others, by dynamically calculating a best known configuration for the workspace on the target computing platform based upon the performance capabilities of the target computing platform so that performance of the transitioned workspaces is enhanced.

With the advent of hybrid computing, the concepts of orchestration, IHS optimization, and composition for Operating System (OS) and System On Chip (SOC) agnostic user interface (UI) and User Experience (UX) design paradigms for modern IHSs has become a key factor to user productivity. Additionally, the use of orchestration should not diminish key aspects of traditional client experience; or stated differently, do no harm. Hybrid Computing introduces a new concept referred to workspaces that manages workloads of the IHS. Each workspace either runs as a cloud-native ("cloud") device, or an endpoint-native ("endpoint"), which could, and often does involve transitioning workloads between each other from time to time. The hybrid computing concept also involves workload orchestration with concurrent workspaces of varying performance and security Key Process Indicators (KPIs) running on the endpoint as well as in the cloud. The workspaces, for example, may be implemented using container technologies, such as described herein below.

Workspace continuity is a key concept for implementing User mobility across IHS devices (e.g., mobile devices like smart phone, tablets etc.). IHS devices used to implement user mobility often vary with respect to a range of factors, such as OS type, form factors, supported peripherals, network connectivity (e.g., Wired/Wireless), and hardware resources (like memory, CPU etc.). For workspace experience continuity, support for equivalent user experience across the various form factors, workspace configuration, and/or location may be beneficial.

Many applications used nowadays are executed in workspaces for assorted reasons including enhanced security of workspace applications from external threats as well as protection of an IHS environment from threats generated by those applications. Example workspaces may include software-based workspaces (e.g., docker, snap, Progressive Web application (PWA), Virtual Desktop Integration (VDI), etc.), hardware-based workspaces (e.g., Virtual Machines (VMs)), or cloud-based workspaces that are accessed from a publicly available communication network, such as the Internet. These workspaces are typically managed using orchestrators that can manage software-based workspaces, hardware-based workspaces, as well as cloud-based workspaces. Workspaces may have varying levels of performance and security KPIs running in the IHS as well as in the cloud.

For better scalability, modern computing systems should allow the workspaces to be distributed across IHS and cloud platforms. Implementing such capabilities would provide, among other things, load balancing and orchestration. If the IHS is overloaded with many applications, certain workspace applications could be off-loaded to another platform. As such, servicing the applications may become easier. For example, if the workspace application (e.g., VSCode) requires an important update, and the user is continually using the application, the workspace parametric data (e.g., working files, state-based parameters associated with the workspace application, etc.) of those applications needs to be cached and copied while maintaining the state of those files, thus yielding a burdensome affair. Embodiments of the present disclosure provide a solution to this problem, among other problems, using a workspace transition system that dynamically calculates a best known configuration to normalize the state transition, and to periodically update and synchronize its operation before moving it to the target IHS device as will be described in detail herein below.

FIG. 1 illustrates an example workspace transitioning system 100 that may be used to dynamically calculate a best known configuration for the workspace on the target computing platform based upon the performance capabilities of the target computing platform according to one embodiment of the present disclosure. The system 100 generally involves multiple computing devices, which in this particular example embodiment, is a computing device IHS 104a, a smartphone IHS 104b, and a tablet IHS 104c (collectively 104) that communicate with one another via a publicly available network, such as the Internet.

To provide a working example, initially the user 110 is conducting a teleconference (e.g., ZOOM) call session on a laptop computer IHS 104a with relatively good performance features. The user 110 may also be running a Visual Collaboration Platform (e.g., MIRO) and several other applications in the background. During the call, the user 110 changes location and thus needs to transfer the call to a mobile device IHS 104b. It would be desirable that, not only the teleconference call session and other apps be transferred to the mobile device IHS 104b within the constraints of that device configuration, but also that the usability of the apps on the mobile device IHS 104b are not unduly hampered. As such, the mobile device IHS 104b may perform a dynamic calculation of BKC on the mobile device IHS 104b based on device configuration, usage pattern and other factors. For example, if the battery configured in the mobile device IHS 104b is low, the BKC calculated for the mobile device IHS 104b may indicate that only the teleconference call session remain active while the other apps are transferred to a standby state so as to not unduly tax the power requirements of the mobile device IHS 104b. Additionally, if the originating IHS (e.g., laptop computer IHS 104a) is a Wi-Fi connection, the device connectivity may drop in performance. The BKC calculations take this parametric data into consideration by, for example, lowering the refresh rate and/or resolution of the imagery shown via the teleconference call session.

Later on when the user 110 arrives at home and begins using a computing tablet IHS 104c, a work-based application generating work files may be transferred to the computing tablet IHS 104c from the mobile device IHS 104b. In this case, the tablet IHS 104b calculates the BKC and determines from the calculation that a security level of a Wi-Fi connection is reduced relative to that of the mobile device IHS 104b. As such, the system 100 may inhibit certain activities from being performed on the work files and/or on the tablet IHS 104c itself. The next day when the user 110 returns to work, however, when the application is again transitioned to the work computing device IHS 104a, the work files may be accessed in the normal manner. It may be important to note that the calculated BKC for every IHS device will not be same all the time since connected peripherals and device state will vary from time to time. Therefore in some embodiments, the system 100 may perform the BKC calculation at ongoing (e.g., periodic) intervals to account for changes in the user's mode of operation and type of applications used as will be described in detail herein below.

Figure 2:
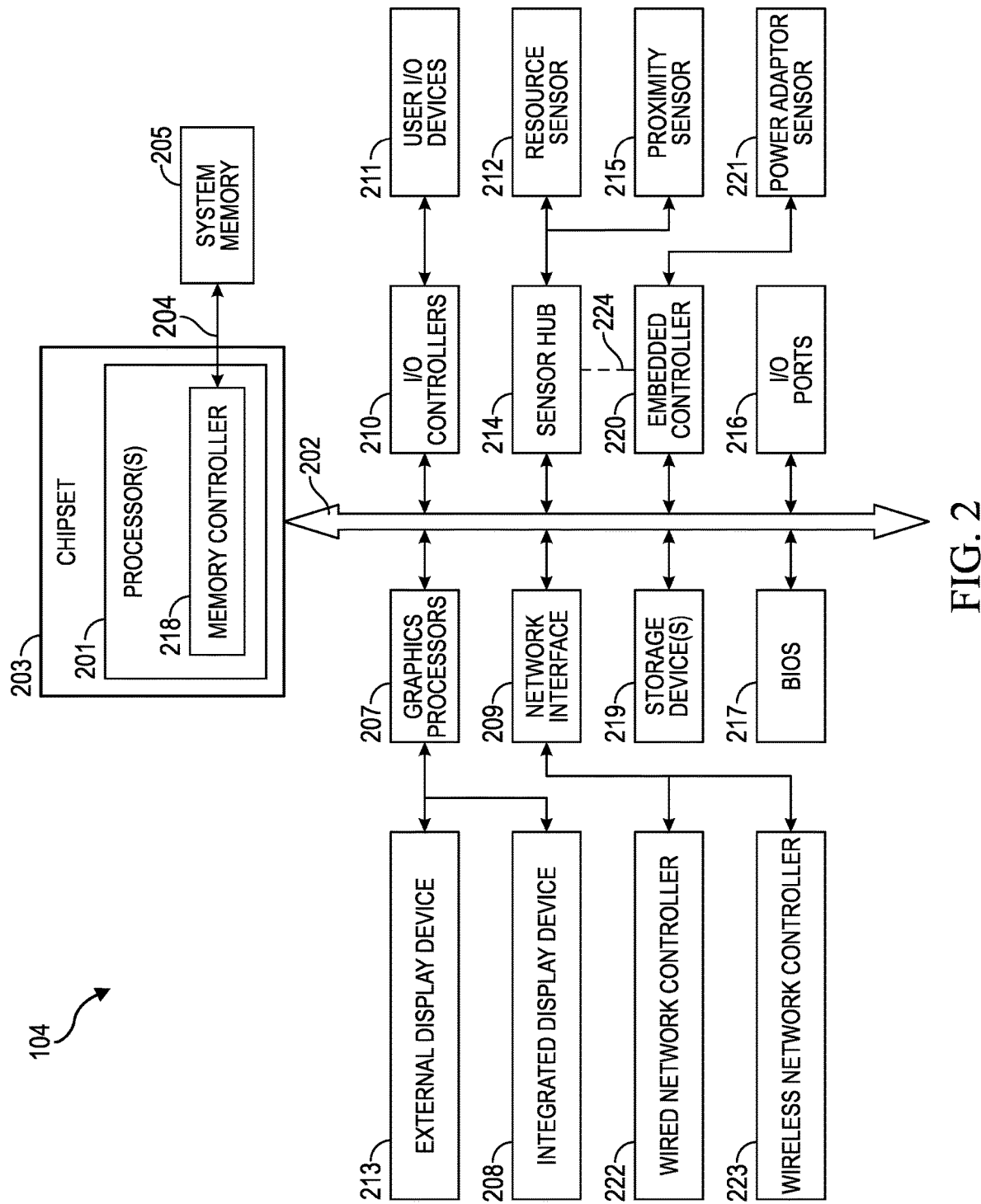
FIG. 2 is a block diagram illustrating components of an example Information Handling System (IHS) that may be configured to manage the transition of workspaces from one IHS to another according to one embodiment of the present disclosure.

FIG. 2 is a block diagram illustrating components of an example IHS 104 that may be configured to manage the transition of workspaces from one IHS to another according to one embodiment of the present disclosure. IHS 104 may be incorporated in whole, or part, as IHS 104 of FIG. 1. As shown, IHS 104 includes one or more processors 201, such as a Central Processing Unit (CPU), that execute code retrieved from system memory 205. Although IHS 104 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 104 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 104 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 104, bus 202 is illustrated as a single element. Various embodiments may utilize any number of separate buses to provide the illustrated pathways served by bus 202.

In various embodiments, IHS 104 may include one or more I/O ports 216 that may support removable couplings with diverse types of external devices and systems, including removable couplings with peripheral devices that may be configured for operation by a particular user of IHS 104. For instance, I/O 216 ports may include USB (Universal Serial Bus) ports, by which a variety of external devices may be coupled to IHS 104. In addition to or instead of USB ports, I/O ports 216 may include diverse types of physical I/O ports that are accessible to a user via the enclosure of the IHS 104.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 104 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 104. User I/O devices 211 may interface with an I/O controller 210 through wired or wireless couplings supported by IHS 104. In some cases, I/O controllers 210 may support configurable operation of supported peripheral devices, such as user I/O devices 211.

As illustrated, a variety of additional resources may be coupled to the processor(s) 201 of the IHS 104 through the chipset 203. For instance, chipset 203 may be coupled to network interface 209 that may support diverse types of network connectivity. IHS 104 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support diverse types of network connectivity, such as the network connectivity utilized by IHS 104.

Chipset 203 may also provide access to one or more display device(s) 208 and 213 via graphics processor 207. Graphics processor 207 may be included within a video card, graphics card or within an embedded controller installed within IHS 104. Additionally, or alternatively, graphics processor 207 may be integrated within processor 201, such as a component of a system-on-chip (SoC). Graphics processor 207 may generate Display information and provide the generated information to one or more Display device(s) 208 and 213, coupled to IHS 104.

One or more Display devices 208 and 213 coupled to IHS 104 may utilize LCD, LED, OLED, or other Display technologies. Each Display device 208 and 213 may be capable of receiving touch inputs such as via a touch controller that may be an embedded component of the Display device 208 and 213 or graphics processor 207, or it may be a separate component of IHS 104 accessed via bus 202. In some cases, power to graphics processor 207, integrated Display device 208 and/or external Display device 213 may be turned off, or configured to operate at minimal power levels, in response to IHS 104 entering a low-power state (e.g., standby).

As illustrated, IHS 104 may support an integrated Display device 208, such as a Display integrated into a laptop, tablet, 2-in-1 convertible device, or mobile device. IHS 104 may also support use of one or more external Display devices 213, such as external monitors that may be coupled to IHS 104 via distinct types of couplings, such as by connecting a cable from the external Display devices 213 to external I/O port 216 of the IHS 104. In certain scenarios, the operation of integrated displays 208 and external displays 213 may be configured for a particular user. For instance, a particular user may prefer specific brightness settings that may vary the Display brightness based on time of day and ambient lighting conditions.

Chipset 203 also provides processor 201 with access to one or more storage devices 219. In various embodiments, storage device 219 may be integral to IHS 104 or may be external to IHS 104. In certain embodiments, storage device 219 may be accessed via a storage controller that may be an integrated component of the storage device. Storage device 219 may be implemented using any memory technology allowing IHS 104 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 104 also includes Basic Input/Output System (BIOS) 217 that may be stored in a non-volatile memory accessible by chipset 203 via bus 202. Upon powering or restarting IHS 104, processor(s) 201 may utilize BIOS 217 instructions to initialize and test hardware components coupled to the IHS 104. BIOS 217 instructions may also load an operating system (OS) (e.g., WINDOWS, MACOS, iOS, ANDROID, LINUX, etc.) for use by IHS 104.

BIOS 217 provides an abstraction layer that allows the operating system to interface with the hardware components of the IHS 104. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 104 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 104 (e.g., CPU 201, GPU 207, system memory 205, etc.). In certain embodiments, sensor hub 214 may also include capabilities for determining a location and movement of IHS 104 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 104, absence from IHS 104, and/or distance from IHS 104 (e.g., near-field, mid-field, or far-field).

In certain embodiments, sensor hub 214 may be an independent microcontroller or other logic unit that is coupled to the motherboard of IHS 104. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 104.

As illustrated, IHS 104 may utilize embedded controller (EC) 220, which may be a motherboard component of IHS 104 and may include one or more logic units. In certain embodiments, EC 220 may operate from a separate power plane from the main processors 201 and thus the OS operations of IHS 104. Firmware instructions utilized by EC 220 may be used to operate a secure execution system that may include operations for providing various core functions of IHS 104, such as power management, management of operating modes in which IHS 104 may be physically configured and support for certain integrated I/O functions.

EC 220 may also implement operations for interfacing with power adapter sensor 221 in managing power for IHS 104. These operations may be utilized to determine the power status of IHS 104, such as whether IHS 104 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 104 may not include each of the components shown in FIG. 2. Additionally, or alternatively, IHS 104 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
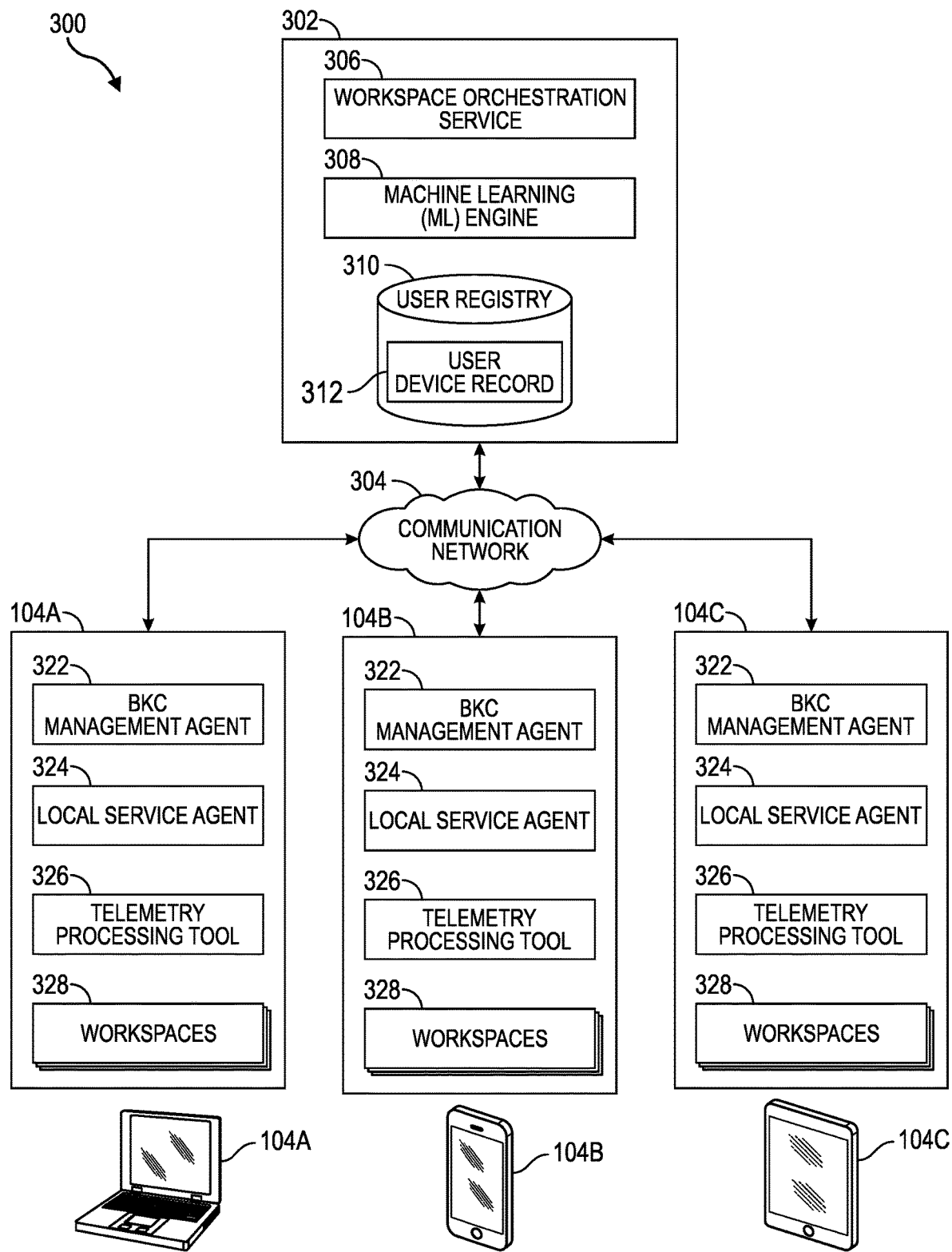
FIG. 3 illustrates an example embodiment showing several components of the workspace transitioning system according to one embodiment of the present disclosure.

FIG. 3 illustrates an example embodiment showing several components of a workspace transitioning system 300 according to one embodiment of the present disclosure. As shown, the computing device IHS 104a, smartphone IHS 104b, and tablet IHS 104c are in communication with a cloud portal 302 via a communication network 304. The cloud portal 302 is configured with a workspace orchestration service 306, a Machine Learning (ML) engine 308, and a user registry 310 that stores a user device record 312 associated with the user 110 of the workspace transitioning system. Although only one user device record 312 is shown and described herein, it should be appreciated that the cloud portal 302 may store and maintain multiple user device records 312 for a corresponding number of multiple users of the cloud portal 302.

Each IHS 104 is configured with a BKC management agent 322, a local service agent 324, and a telemetry processing tool 326. The work computer IHS 104a includes one or more workspaces 328, which are managed by the workspace orchestration service 306, and provide the user 110 with access to protected data or other resources within each workspace 328. For example, each workspace 328 may be configured with one or more applications, such as MICROSOFT POWERPOINT, MICROSOFT EXCEL, MICROSOFT WORD, ADOBE ILLUSTRATOR, ADOBE AFTER EFFECTS, ADOBE MEDIA ENCODER, ADOBE PHOTOSHOP, ADOBE PREMIER, AUTODESK AUTOCAD, AVID MEDIA COMPOSER, ANSYS FLUENT, ANSYS WORKBENCH, SONAR CAKEWALK, and the like; as well as less resource-intensive applications, such as media players, web browsers, document processors, email clients, etc. The workspace orchestration service 306 functions to transition certain workspaces 328 between the other IHSs 104 of the system 100 based upon the importance of each workspace 328 to the user 110, and the performance capabilities of the target IHS 104. Although the present embodiment is described in terms of workspaces 328 that may be migrated from one IHS 104 to another, it should be appreciated that in other embodiments, the workspace transitioning system 100 may be used to transition one or more applications that are not managed by any workspace from one IHS 104 to another.

The local service agent 324 and telemetry processing tool 326, which operates on IHS 104, is configured to interoperate with workspace orchestration service 306 to transition workspaces 328 from one IHS 104 to another. In one embodiment, the local service agent 324 may be configured with a launch point for the workspaces 328 that may be provided in the form of a portal (e.g., a webpage, OS application or special purpose workspace) that includes a user interface that allows the user 110 to request access to managed resources of the workspaces 328. In some embodiments, local service agent 324 runs on IHS 104 and interoperates with remote workspace orchestration service 306. Examples of launch point 203 technologies may include WORKSPACE ONE INTELLIGENT HUB from WMWARE, INC., and DELL HYBRID CLIENT from DELL TECHNOLOGIES INC., among others.

The user device record 312 stores information associated with IHSs 104 that are registered for use by the user 110 with the cloud portal 302. For example, the user device record 312 may store a Globally Unique ID (GUID) and a network address of the computing device IHS 104a, smartphone IHS 104b, and tablet IHS 104c that were obtained from either the user or IHS 104 when it was registered with the cloud portal 302. The workspace orchestration service 306 may receive the information to be included in the user device record 312 as the IHS 104 is registered for use with the cloud portal 302, such as subsequent to the user 110 taking constructive possession of the IHS 104 from its vendor.

Calculation and enforcement of the BKC will be done by the IHS telemetry processing tool 326 running as a cloud service using the BKC management agent 322 running on every IHS 104. Multiple aspects may be considered for each BKC calculation. Examples of such aspects may include a memory consumption of each workspace 328, a CPU usage of each workspace 328, a device power state (e.g., AC power, battery power with relatively good battery status, battery power with relatively poor battery status, etc.), and network connectivity status to name a few. In one embodiment, the BKC calculation may be determined based upon a dominant usage of one workspace 328 relative to other workspaces 328. That is, the system may be configured to detect which workspaces 328 are being used the most, and in response, adjust the BKC calculation so that those workspaces 328 receive the most optimization.

To provide an example scenario, when the user 110 transitions from the work computer IHS 104a to the mobile device IHS 104b, the user 110 is currently using two workspaces 328, namely workspace 1 and workspace 2. Workspace 1 is configured with a locally installed video editor (e.g., VISUAL STUDIO ENTERPRISE) where he is currently working on a new feature, code that is under development resides in a thumb drive available to workspace 1, and an active call over a teleconferencing tool (e.g., ZOOM) is currently being conducted. Workspace 2, on the other hand, is currently running video software (e.g., MIRO) and business-related software (e.g., CONFLUENCE) where the user 110 is creating some design documents. Once the user 110 transitions to the mobile phone IHS 104b, which is less secure and has relatively more limited resources, the BKC calculation will come into play. For this scenario on the mobile phone IHS 104b, the user 110 cannot work on the video software because the source code and thumb drive will not be available. Additionally, if the battery level of the mobile phone IHS 104b is low, then the camera which would otherwise be used in the teleconference tool will be turned off according to the BKC calculation by the telemetry processing tool 326. Based on device and resource constraints for workspace 2, only the active application will be rendered first, and the other app will be in sleep state until user clicks on it according the to the BKC calculation by the telemetry processing tool 326.

The BKC for either IHS 104 at any given moment is calculated by factoring in multiple parameters, such as which peripherals are connected and available, resource configuration of the IHS 104, any identified usage pattern of the user 110, network connectivity status, and the like. FIG. 4 illustrates how two example BKCs 400a, 400b may be calculated using two different IHSs 404a, 404b. In particular, each IHS 404a, 404b may possess different performance values 406 for various attributes 408 associated with connected peripherals, device configuration, user's usage pattern, and network connectivity status parameters 410. Thus, the BKC1 400a may be substantially different from BKC2 400b based on those values obtained via the IHS telemetry processing tool 326. Thus, at any given instance the calculated BKC may be any combination of connected peripheral state, resource configuration, user's usage pattern, and/or network connectivity status. In addition to calculating the BKC dynamically for the IHS devices, the cloud service backend may also synchronize the BKC to the connected IHSs 104 periodically so that transition of peripherals and workspaces managing their respective applications may be relatively seamless and the transition conducted at least partially in real-time based on the current state of the target IHS 104.

Referring again to FIG. 3, the local service agent 324 uses the ML engine 308 to identify the importance of certain workspaces 328 based on their relevance to the user 110. The local service agent 324 may also use supervised Machine Learning (ML) of the ML engine 308 to identify the most productive workspaces 328 for the user 110. In one embodiment, local service agent 324 may include features, or form a part of, the DELL PRECISION OPTIMIZER. In general, the local service agent 324 uses the ML engine 308 to provide for identifying the relative importance of workspaces 328 by obtaining data from the various resources of the IHS 104, and analyzing the obtained data to generate ML-based hints based upon the overall coordinated operation of some, most, or all resources that are used to execute the workspaces 328. In one embodiment, the local service agent 324 may include a policy management function that identifies the relative importance of the workspaces 328 according to one or more policies. For example, the policy management function may limit hints that would be otherwise applied to certain resources based upon those hints causing undue loading upon certain other resources in the IHS 104. Furthering this example, while the local service agent 324 would otherwise infer that an increase of memory caching provided by system memory 205 may be beneficial to the operation of a particular workspace 328, its knowledge about other applications running on originating and target IHS 104 as well as the current state of other resources in the IHS 104 may indicate that such inference should be reduced (e.g., throttled) so as to not unduly overburden those other resources. Additionally, the local service agent 324 may use the policy management function to infer hints for other resources in IHS 104 so that most or all of the resources in IHS 104 may be collectively optimized for operation of the target application 320.

The local service agent 324 uses the ML engine 308 to monitor each resource of the IHS 104 along with telemetry data obtained directly from resources, and various sensors in the IHS 104 to characterize its resource utilization. For example, the ML engine 308 may obtain data from the resources of the IHS 104 in addition to telemetry data from the IHS telemetry processing tool 326 and/or directly from sensors configured in the originating IHS and target IHS to generate one or more ML-based hints associated with operating characteristics of the workspaces 328. Once the ML engine 308 has collected characteristics over a period of time, it may then process the collected data using statistical descriptors to extract the application performance features of each workspace 328. For example, the ML engine 308 may monitor each workspace 328 over time to estimate its resource usage with respect to various aspects, such as which actions performed by the workspace 328 cause certain resources to encounter loading, events occurring on the IHS 104 that causes the workspace 328 to require a relatively elevated level of resource usage, and a time period of day in which these actions are encountered. Once the ML engine 308 has collected characteristics over a period of time, it may then process the collected data using statistical descriptors to extract the application performance features associated with the workspaces 328. The ML engine 308 may use a machine learning algorithm such as, for example, a Bayesian algorithm, a Linear Regression algorithm, a Decision Tree algorithm, a Random Forest algorithm, a Neural Network algorithm, or the like.

As shown, the ML engine 308 is stored and executed on the cloud portal 302, and accessible from a communication network, such as the Internet. In one embodiment, for example, the ML engine 308 may be provided as a subscription service, in which users of IHS 104 may register for providing ML optimization such as described herein. In other embodiments, the local service agent 324 may be stored and executed on the IHS 104 it is configured to provide workspace transition services for.

Figure 5A:
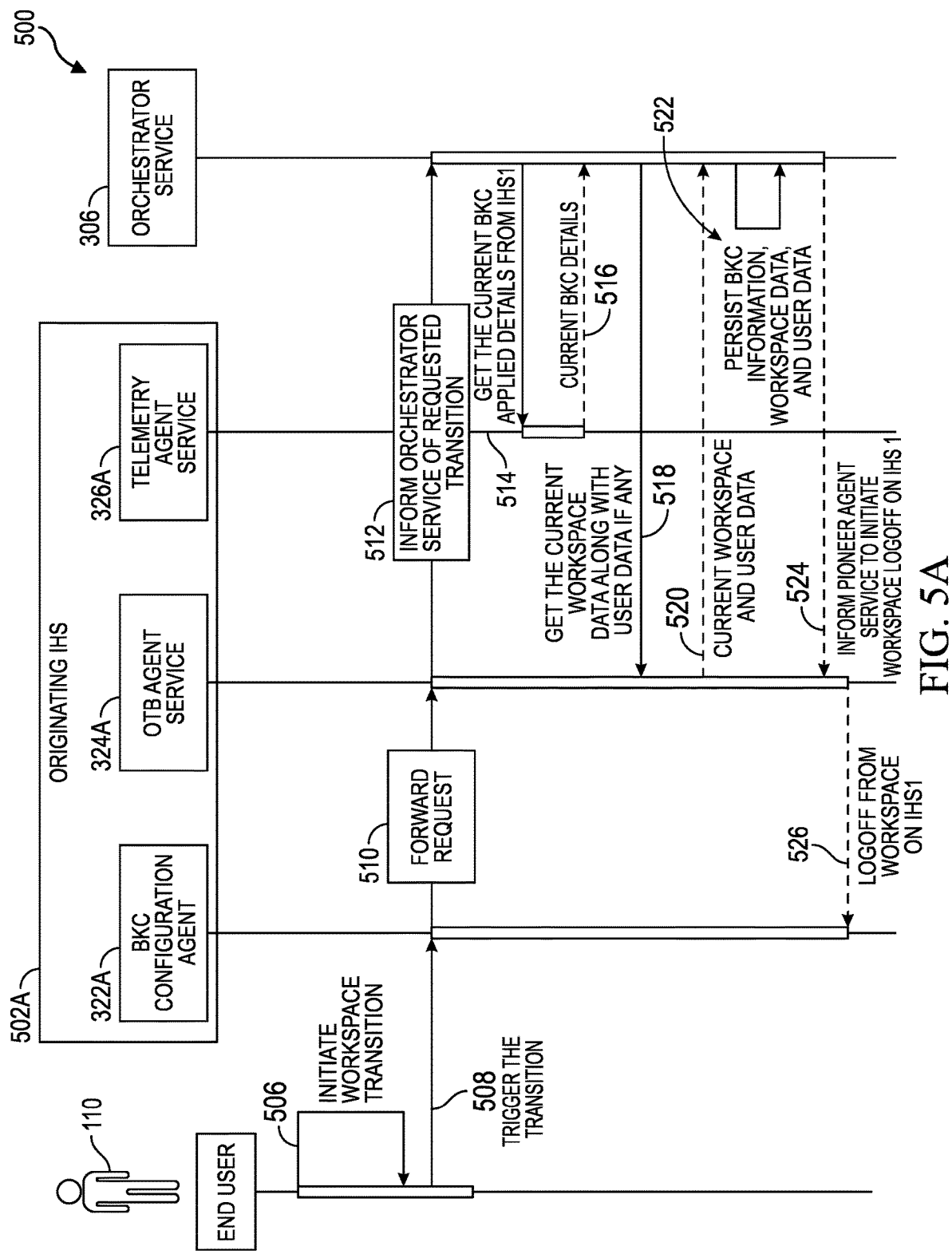
FIGS. 5A and 5B illustrate example workspace transitioning methods that may be performed to transition certain workspaces from an originating IHS to a target IHS according to one embodiment of the present disclosure.
Figure 5B:
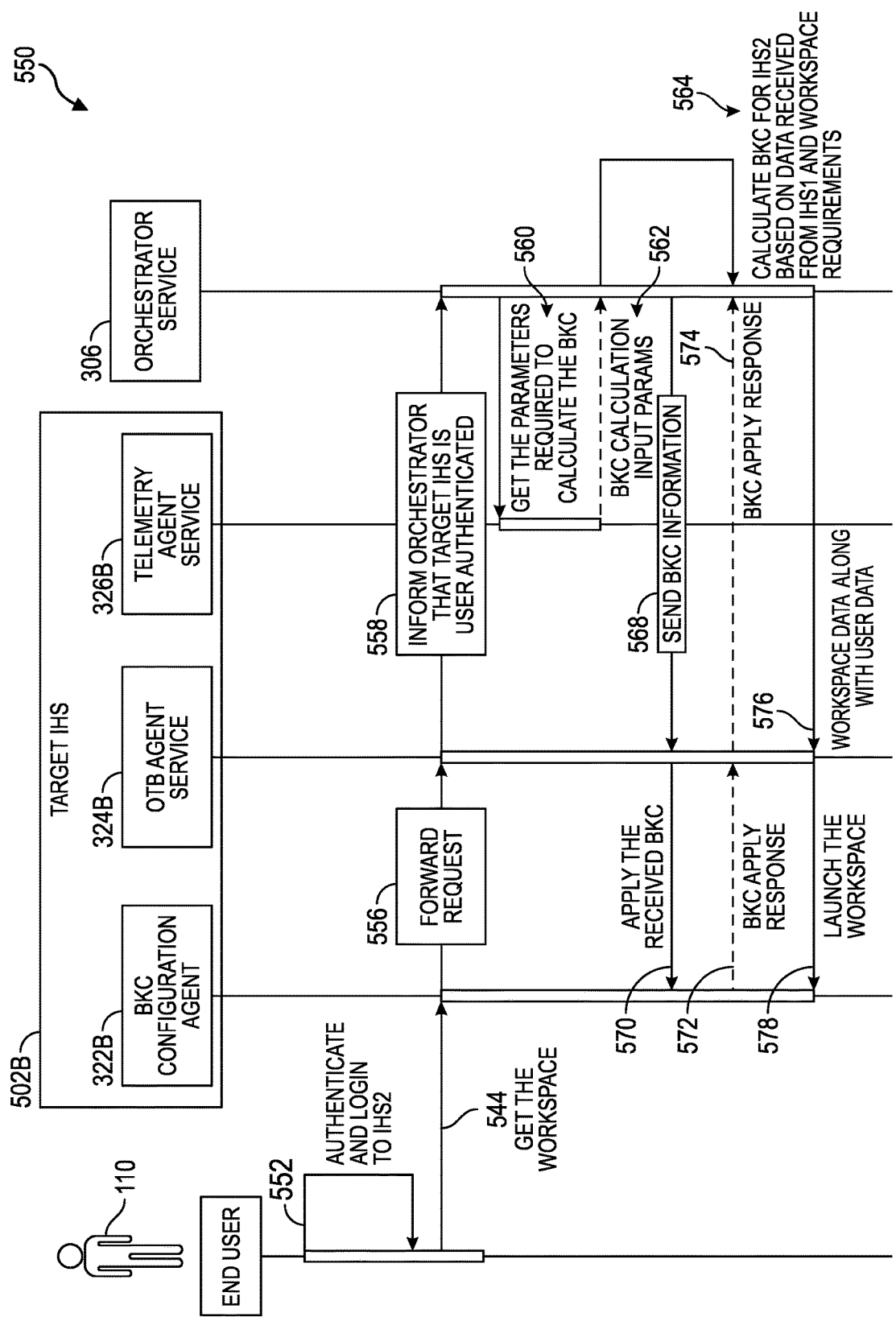

FIGS. 5A and 5B illustrate example workspace transitioning methods 500, 550 that may be performed to transition certain workspaces 328 from an originating IHS 502a to a target IHS 502b according to one embodiment of the present disclosure. In particular, FIG. 5A illustrates steps that may be performed to transition certain workspaces 328 from the originating IHS 502a, while FIG. 5B illustrates certain steps that may be performed to transition to a target IHS 502b. Initially, both IHSs 502a, 502b are registered with the cloud portal 302, and both are configured with a BKC management agent 322, a local service agent 324, and an IHS telemetry processing tool 326 that have been launched on their respective IHSs 502a, 502b and running in the background to gather information about the IHSs 502a, 502b, such as the user's operation of one or more workspaces 328 on the originating IHS 502a, the performance capabilities of the target IHS 502b, or other aspects of IHSs' 502a, 502b operation, such as those described herein above.

Initially referring to FIG. 5A, a workspace transition is initiated at step 506. In one embodiment, the method 500 may receive user input for manually initiating a workspace transition. In another embodiment, the method 500 may initiate a transition in response to one or more triggering events that occur. For example, if the method 500 determines that network connectivity on the originating his 502a is lost, it may automatically initiate the transition if the most dominant workspace 328 identified for the user 110 is running an application that the ML engine 308 has determined to be a communications intensive application (e.g., video streaming app, teleconference session, etc.). In another embodiment, the manual transition request may include a particular target IHS that the user 110 wishes to transfer to. For example, if the user 110 has both a mobile phone IHS 104b and a tablet IHS 104c nearby, the request may include an indication of a particular IHS 104 to be the target IHS 502b.

When the transition is triggered, the method 500 notifies the BKC management agent 322a that a transition has been requested at step 508. In response, the BKC management agent 322a forwards the request to the 324a at step 510. Thereafter at step 512, the local service agent 324a informs the workspace orchestration service 306 that a transaction request has been received. For example, if the user manually requested the transition 110, the local service agent 324a may inform the workspace orchestration service 306 of the user's intention to transition one or more workspaces 328 to the target IHS 502b. At step 514, the method 500 requests the current BKC that is being applied to each workspace 328 from the IHS telemetry processing tool 326a. In response, the local service agent 324a provides the current BKC details to the workspace orchestration service 306 at step 516.

At step 518, the workspace orchestration service 306 requests current workspace data along with any user data if such exists. Current workspace data may include, for example, any open files that are being modified by an application in the workspace 328, environment variables associated with the workspace 328, communication session parameters, login session parameters used by the workspace 328 or any application managed by the workspace 328, and the like. The local service agent 324a responds to the request by providing the current workspace data and any user data to the workspace orchestration service 306 at step 520. Thereafter at step 522, the workspace orchestration service 306 persist the BKC details, workspace data, and user data. The workspace orchestration service 306 may persist the BKC details, workspace data, and user data so that it can be processed by the method 550 described below to transition the workspaces 328 to the target IHS 502b.

At step 524, the workspace orchestration service 306 informs the local service agent 324a to initiate logging off of the workspaces 328 on the originating IHS 502a. For example, the workspace orchestration service 306 may inform the local service agent 324a to initiate logoff of the user from the originating IHS 502a, thus causing all workspaces 328 on the originating IHS 502a to be torn down. Thereafter at step 526, the local service agent 324a communicates with the 322a to logoff the workspaces 328 that are being transitioned to the target IHS 502b.

The aforedescribed method 500 may be performed each time a workspace transition is performed from an originating IHS 502a. Nevertheless, when use of the method 500 is no longer needed or desired, the process ends.

The method 550 of FIG. 5B may be performed to transition the workspaces 328, including their respective applications, to a target IHS 502b. The steps of FIG. 5B may be performed at any suitable time in preparation for migrating the workspaces 328 to the environment of the target IHS 502b. Initially at step 552, the method 550 authenticates and logs the user 110 onto the target IHS 502b. Step 552 may be performed at any suitable time, such as before the steps of method 500 are performed, or after the steps of method 500 have been performed. In one embodiment, the step 552 is performed in order to allow the workspaces 328 to be securely transitioned to the target IHS 502b.

At step 554, the method 500 notifies the BKC management agent 322b that a transition has been requested. In response, the BKC management agent 322a forwards the request to the 324b at step 556. The BKC management agent 322b may be notified according to user input, or according to a notice (e.g., from such as a notice received from the workspace orchestration service 306) that certain workspaces 328 are to be transitioned onto the target IHS 502b. Thereafter at step 558, the local service agent 324a informs the workspace orchestration service 306 that the target IHS 502b is user authenticated and ready to receive the workspaces 328.

At step 560, the workspace orchestration service 306 issues a request to the IHS telemetry processing tool 326b to obtain parameters associated with a BKC to be applied to the target IHS 502b. The IHS telemetry processing tool 326b calculates the BKC using attribute values obtained from the resources of the target IHS 502b such as shown and described with reference to FIG. 4. The IHS telemetry processing tool 326b then sends the calculated BKC to the workspace orchestration service 306 at step 562. At step 564, the workspace orchestration service 306 calculates an adjusted BKC based upon the BKC obtained from the IHS telemetry processing tool 326b and the originating IHS 502a. In one aspect, the originating IHS 502a BKC may be used to weight certain factors of the calculated BKC for the target IHS 502b for enhancing the performance of the target IHS 502b for the user 110. For example, the calculated BKC for the originating IHS 502a may have been adjusted to optimize a currently proceeding teleconference session that has been ongoing in the originating IHS 502a. The method 550 may take advantage of this previously performed optimization by weighting the values of the BKC calculated for the target IHS 502b so that it may handle the transitioned teleconference session with those optimized parameters.

The workspace orchestration service 306 then sends the calculated BKC information to the local service agent 324b at step 568. At step 570, the local service agent 324b communicates with the BKC management agent 322b to apply the calculated BKC. That is, the BKC management agent 322b may communicate with the various resources in the target IHS 502b to adjust their operation for optimizing the performance of the transitioned workspaces 328. For example, the 322b may administer turning on/off certain resources (e.g., connected peripherals, CPU speed, memory allocation to each workspace 328, network connectivity throughput, etc.), reducing/increasing the workload of certain other resources, etc.) based on the calculated BKC. Thereafter at step 572, the local service agent 324b receives an acknowledgment from the 322b, that the BKC has been applied, and at step 574, the local service agent 324b then forwards the acknowledgment to the workspace orchestration service 306.

At step 576, the workspace orchestration service 306 sends the workspace data, user data, and other data associated with operation of the transitioned workspaces 328 to the local service agent 324b. The local service agent 324b then uses this data to launch the workspaces 328 on the target IHS 502b at step 578. At this point, the workspaces 328 have been successfully transitioned to the target IHS 502b and the user 110 may resume operation of the workspaces 328 along with their associated applications. The aforedescribed method 550 may be performed each time a workspace transition is performed to a target IHS 502b. Nevertheless, when use of the method 550 is no longer needed or desired, the process ends.

Although FIGS. 5A and 5B describe example methods 500, 550 that may be performed to monitor and remediate audio dosage levels incurred by a user, the features of the methods 500, 550 may be embodied in other specific forms without deviating from the spirit and scope of the present disclosure. For example, either of the methods 500, 550 may perform additional, fewer, or different operations than those described in the present examples. For another example, the either of the methods 500, 550 may be performed in a sequence of steps different from that described above. As yet another example, certain steps of either of the methods 500, 550 may be performed by other components other than those described above. For example, certain steps of the aforedescribed methods 500, 550 may be performed by certain components of the system other than what is described herein above without departing from the spirit and scope of the present disclosure.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) orchestration system, comprising:
    at least one processor; and
    at least one memory coupled to the at least one processor, the at least one memory having program instructions stored thereon that, upon execution by the at least one processor, cause a first computing device executed locally by the user to:
        receive a request to transition a workspace from the first computing device to a second computing device executed locally by the user and in remote communication with the first computing device through a network;
        calculate a first Best Known Configuration (BKC) for executing the workspace on the first computing device, the BKC based on workspace parametric data associated with operation of the workspace on the first computing device; and
        transmit the obtained BKC to the second computing device, wherein the second computing device uses the BKC to calculate a second BKC for executing the workspace on the second computing device based on the capabilities of the second computing device, and instantiate the workspace on the second computing device using the second BKC.

2. The IHS of claim 1, wherein the program instructions, upon execution, further cause the IHS to:
    determine a dominant usage of one of a plurality of the workspaces executed on the first computing device; and
    calculate the first and second BKCs according to the dominant usage of the one workspace.

3. The IHS of claim 1, wherein the program instructions, upon execution, further cause the first computing device to calculate the first and second BKCs according to at least one of a memory consumption of the workspace, a CPU usage of the workspace, a device power state of the first computing device, and network connectivity status.

4. The IHS of claim 3, wherein the first and second BKCs are based on a determined workload of one or more applications executed in the workspace.

5. The IHS of claim 1, wherein the program instructions, upon execution, further cause the IHS to:
    perform a Machine Learning (ML) process to communicate with an online cloud portal to administer a transition of the workspace from the first computing device to the second computing device.

6. The IHS of claim 5, wherein the program instructions, upon execution, further cause the first computing device to logoff the workspace from the first computing device following the transition.

7. The IHS of claim 1, wherein the program instructions, upon execution, further cause the IHS to:
    perform a Machine Learning (ML) process to calculate the BKC at ongoing intervals.

8. The IHS of claim 1, wherein the program instructions, upon execution, further cause the IHS to perform a Machine Learning (ML) process to calculate the first and second BKCs.

9. The IHS of claim 1, wherein the program instructions, upon execution, further cause the IHS to commence transition of the workspace to the second computing device due to at least one of receipt of user input or a detection of a triggering event that has occurred on the first computing device.

10. A workspace transitioning method comprising:
    receiving a request to transition a workspace from a first computing device executed locally by the user to a second computing device executed locally by the user and in remote communication with the first computing device through a network;
    calculating a first Best Known Configuration (BKC) for executing the workspace on the first computing device, the BKC based on workspace parametric data associated with operation of the workspace on the first computing device; and
    transmitting the obtained BKC to the second computing device, wherein the second computing device uses the BKC to calculate a second BKC for executing the workspace on the second computing device based on the capabilities of the second computing device, and instantiating the workspace on the second computing device using the second BKC.

11. The workspace transitioning method of claim 10, further comprising:
    determining a dominant usage of one of a plurality of the workspaces executed on the first computing device; and
    calculating the first and second BKCs according to the dominant usage of the one workspace.

12. The workspace transitioning method of claim 10, further comprising calculating the first and second BKCs according to at least one of a memory consumption of the workspace, a CPU usage of the workspace, a device power state of the first computing device, and network connectivity status.

13. The workspace transitioning method of claim 10, further comprising performing a Machine Learning (ML) process to communicate with an online cloud portal to administer a transition of the workspace from the first computing device to the second computing device.

14. The workspace transitioning method of claim 13, further comprising logging off the workspace from the first computing device following the transition.

15. The workspace transitioning method of claim 10, further comprising performing a Machine Learning (ML) process to calculate the BKC at ongoing intervals to maintain synchronization with the BKC calculated for the second computing device.

16. The workspace transitioning method of claim 10, further comprising wherein the program instructions, upon execution, further cause the IHS to perform a Machine Learning (ML) process to calculate the first and second BKCs.

17. The workspace transitioning method of claim 10, further comprising commencing transition of the workspace to the computing platform due to at least one of receipt of user input or a detection of a triggering event that has occurred on the first computing device.

18. A memory storage device having program instructions stored thereon that, upon execution by one or more processors of an Information Handling System (IHS), cause the IHS to:
- receive a request to transition a workspace from a first computing device to a second computing device;
- calculate a first Best Known Configuration (BKC) for executing the workspace on the first computing device, the BKC based on workspace parametric data associated with operation of the workspace on the first computing device; and
- transmit the obtained BKC to the second computing device, wherein the second computing device uses the BKC to calculate a second BKC for executing the workspace on the second computing device based on the capabilities of the second computing device, and instantiate the workspace on the second computing device using the second BKC.

19. The memory storage device of claim 18, wherein the program instructions, upon execution, further cause the IHS to:
- determine a dominant usage of one of a plurality of the workspaces executed on the first computing device; and
- calculate the first and second BKCs according to at least one of a memory consumption of the workspace, a CPU usage of the workspace, a device power state of the first computing device, network connectivity status, and the dominant usage of the one workspace.

20. The memory storage device of claim 18, wherein the program instructions, upon execution, further cause the IHS to perform a Machine Learning (ML) process to communicate with an online cloud portal to administer a transition of the workspace from the first computing device to the second computing device.

* * * * *